(12) United States Patent
Patino

(10) Patent No.: US 6,653,814 B1
(45) Date of Patent: Nov. 25, 2003

(54) METHOD FOR DETERMINING POWER SUPPLY COMPATIBILITY IN A PORTABLE DEVICE

(75) Inventor: Joseph Patino, Pembroke Pines, FL (US)

(73) Assignee: Motorola Inc., Schaumburg, IL (US)

( * ) Notice: Subject to any disclaimer, the term of this patent is extended or adjusted under 35 U.S.C. 154(b) by 4 days.

(21) Appl. No.: 10/185,978

(22) Filed: Jun. 28, 2002

(51) Int. Cl.[7] ................................................. H02J 7/00
(52) U.S. Cl. ........................................................ 320/103
(58) Field of Search ................................. 320/103, 110, 320/112, 114; 307/31, 32, 132 M, 149, 152; 323/282; 363/34, 37; 375/295; 455/195.1

(56) References Cited

U.S. PATENT DOCUMENTS

| | | | | |
|---|---|---|---|---|
| 5,689,412 A | * | 11/1997 | Chen | ........................... 363/125 |
| 6,037,750 A | * | 3/2000 | Von Novak | .................. 320/132 |
| 6,104,759 A | * | 8/2000 | Carkner et al. | ................. 307/31 |
| 6,411,829 B1 | * | 6/2002 | Takenaka | ..................... 320/114 |
| 6,445,164 B2 | * | 9/2002 | Kitagawa | ..................... 320/134 |
| 6,459,175 B1 | * | 10/2002 | Potega | ................... 307/132 M |

* cited by examiner

Primary Examiner—Pia Tibbits
(74) Attorney, Agent, or Firm—Scott M. Garrett

(57) ABSTRACT

A power supply that is compatible with a portable electric or electronic device is provided with a current sensing circuit. When the current exceeds a threshold level in response to the device intentionally changing its current demand, the power supply changes its voltage output level. The voltage change indicates to the device the power supply is a compatible power supply, and indicates the user of the device the power supply is compatible.

9 Claims, 2 Drawing Sheets

METHOD FOR DETERMINING POWER SUPPLY COMPATIBILITY IN A PORTABLE DEVICE

TECHNICAL FIELD

This invention relates in general to battery chargers for portable electric and electronic devices, and more particularly to ensuring compatibility with chargers used to charge the battery of a portable device.

BACKGROUND OF THE INVENTION

Portable electric and electronic devices are in widespread use, and there is a large market for rechargeable batteries and battery chargers. For devices that are in near constant use, it is more cost effective to use rechargeable batteries instead of primary batteries. Examples of such devices are cellular radiotelephones and laptop computers.

Recent advances in battery and electrochemical technology have yielded high capacity battery designs such as that known as lithium ion (Li-ion). Li-ion cells provided a large improvement in energy capacity per unit weight and volume over earlier technologies such as nickel cadmium and nickel hydride technologies. However, Li-ion batteries require a carefully controlled charging regimen to prevent damaging the battery cells. Improperly charging a Li-ion battery can severely shorten its cycle life, its capacity, and may even cause physical damage to the battery cell case, resulting in leakage.

Furthermore, cellular radiotelephones typically now contain charger control circuitry internally, and charging with an incompatible power supply can damage the charger circuitry, or lead to poor performance. If the power supply voltage is too high, it can damage the device. Excessive voltage can cause unanticipated power dissipation in the device, which heats and damages the battery, or can cause a fire risk.

With the great number of chargers presently on the market, there is a risk of an incompatible charger being used to charge a Li-ion battery. When a battery is damaged due to an incompatible charger, the perception is that the quality of the portable device or the battery itself is poor. Therefore there is a need for a means by which an incompatible charger can be identified, and indicated to a user of the portable device.

DETAILED DESCRIPTION OF A PREFERRED EMBODIMENT

Figure 1:
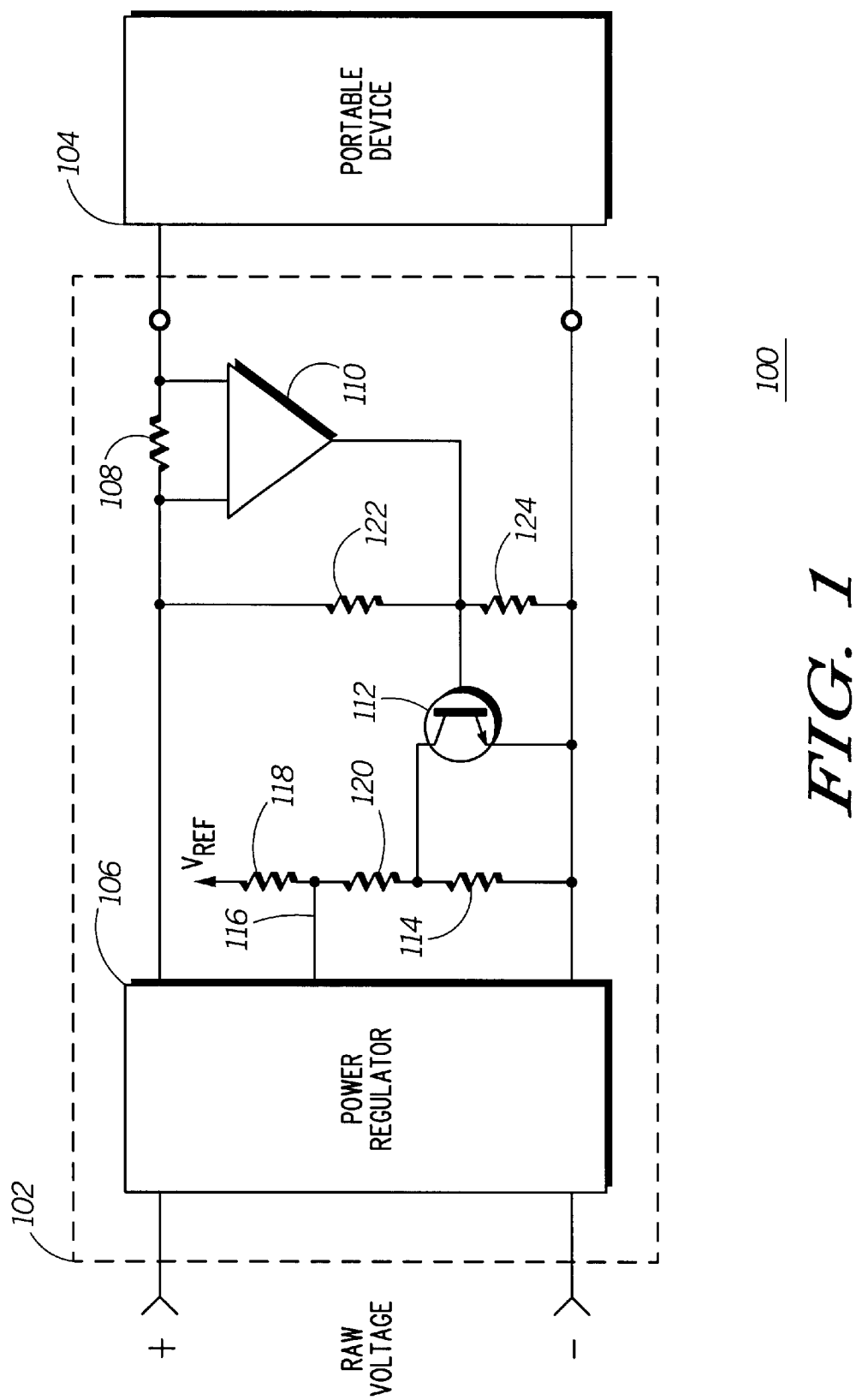
FIG. 1 shows a schematic block diagram of a power supply and portable device, in accordance with the invention.

While the specification concludes with claims defining the features of the invention that are regarded as novel, it is believed that the invention will be better understood from a consideration of the following description in conjunction with the drawing figures, in which like reference numerals are carried forward. The invention solves the problem of incompatible chargers by designing a means into compatible chargers that allows them to be identified by the portable device. The invention provides a charger which changes its output voltage level when the current it is sourcing exceeds a preselected level. The portable device observes the charger voltage, and if the expected change is observed, the device indicates the charger is compatible to the user. If the expected change is not observed, the device indicates the charger is incompatible to the user. The device may also disable charging in the event the charge is an incompatible charger.

Referring now to FIG. 1., there is shown a block diagram 100 of a power supply 102 and portable device 104, in accordance with the invention. The power supply comprises a power regulator 106 to convert raw voltage from an external power source, such as an AC power outlet, to a regulated DC level. The output of the power regulator is provided to the portable device 104 through a series resistor 108. The series resistor has a very low value, preferably 0.1 ohms or less. The voltage across the series resistor as a result of current passing through it is sensed by a comparator circuit 110. When the current through the resistor increases to some preselected level, the voltage across the resistor will cause the comparator circuit output to change. The comparator circuit output is coupled to a switch device, such as, for example, a bipolar transistor 112, which controls a voltage reference circuit. A simple voltage reference circuit includes a reference resistor 114 coupled in parallel with the switch device. The reference resistor is part of a voltage divider circuit which divides a stable voltage reference down and provides a divided voltage 116 to the power regulator for feedback control, as is well known in the art. The voltage divided comprises a pair of series-connected resistors 118 and 120, connected between a stable voltage reference and a reference or ground node. The power regulator provides a means for providing a voltage and an electric current to the battery, each having a magnitude. The comparator circuit and series resistor 108 provide a means for sensing the magnitude of the electric current. The voltage divider and switch means which provided a reference voltage feedback to the power regulator provide a means for changing the voltage magnitude to a preselected level upon detection of the electric current magnitude exceeding a preselected threshold. The circuit may be designed to increase the output voltage, decrease the output voltage, or change the output voltage by a preselected amount. The particulars of how much and in what manner the output voltage changes in response to the output current is a matter of engineering choice.

Figure 2:
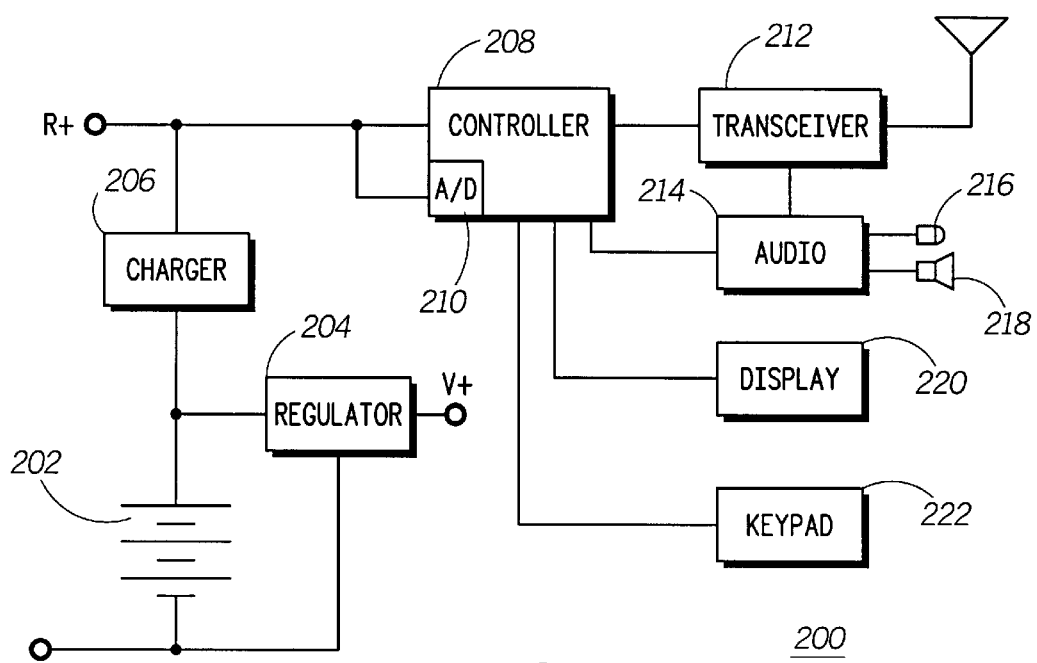
FIG. 2 shows a schematic block diagram of a portable device.

Referring now to FIG. 2, there is shown a schematic block diagram 200 of a portable device. The device has a battery 202 for providing electric power to the components of the device through a regulator 204 which regulates the voltage of the battery to a preselected level. The device has a charger circuit or charge controller 206 for controlling the charging of the battery in accordance with a particular battery charging regimen. The battery is charged with voltage and electric current provided from the power supply's power regular 106, and received at the device at an R+input. This is the regulator voltage of the power regulator 106. The regulator voltage is also fed to a control circuit 208. The control circuit controls operation of the device, and includes a means for detecting the presence of the regulator voltage, such as by coupling it to a microcontroller interrupt input. The control circuit also comprises a means for sensing the level of the regulator voltage, such as a comparator, or an analog to digital converter 210 that measures the regulator voltage.

In the preferred embodiment the device is a mobile communication device and comprises a transceiver 212 for receiving and transmitting radio frequency signals. The transceiver interfaces with an audio circuit 214 that operates a microphone 216 and speaker 218. The controller also operates a display 220 for displaying information, and a keypad 222 for receiving input from a user of the device.

Figure 3:
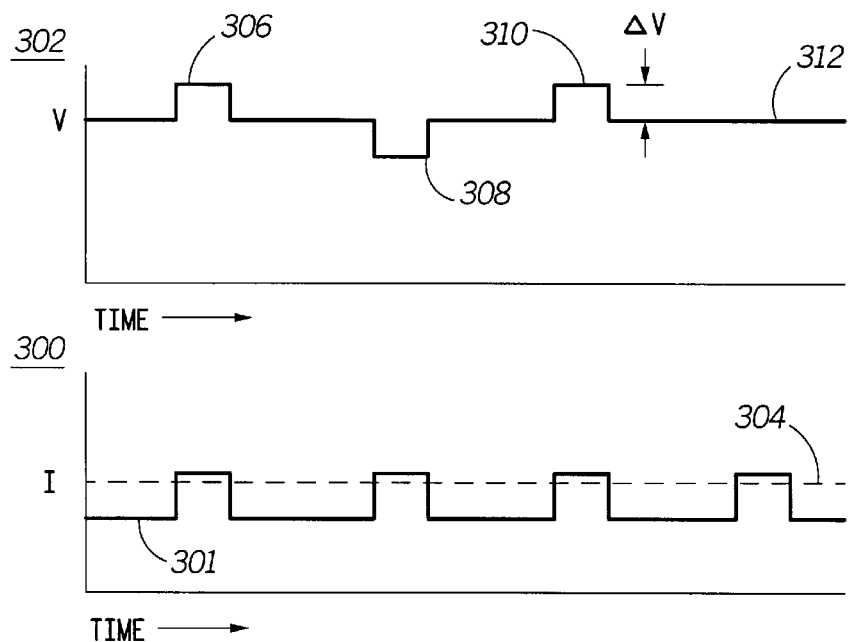
FIG. 3 shows a graph chart diagram of current and voltage provided by a charger during operation of the invention.

FIG. 3 shows what happens during operation of the invention. In FIG. 3 there is shown the electric current 300 and voltage 302 provided by an external power supply connected to the device. The device detects the presence of the charger by detecting the voltage at R+. The charger will then begin providing current at an initial level 301. Shortly thereafter, the device commences changing the electric current demand of the portable device by a preselected amount. This can be done, for example, by turning on portions of the device circuitry, such as the back light of the display. This causes the current to rise above a preselected level 304. The device then commences observing the voltage of the power supply. If the power supply voltage changes to a preselected level upon changing the electric current demand, the device indicates to the user of the portable device that the power supply is compatible. However, if the charger voltage does not change to the preselected level, the device indicates to the user that the power supply is incompatible. The indicating can be done by flashing a light or through an audible means. A compatible power supply can be designed to increase its output to a preselected level (306), decrease its output to a preselected level (308), or change its output by a preselected amount (310). If the power supply is not compatible, its output voltage level will not change (312). If the power supply is determined to not be compatible, the device can cease the charging to avoid potentially damaging the battery, device, or both.

A compatible power supply begins by providing an initial voltage and electric current to the device, then commences sensing the electric current provided to the device. The voltage is regulated to a specific level by providing as much electric current as needed. The power supply then looks for the current exceeding a preselected threshold. If the current exceeds the threshold, the power supply commences changing the initial voltage to a preselected level, wherein, in response to changing the initial voltage, the portable device indicates to a user of the portable device that the power supply is compatible.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for determining power supply compatibility in a portable device, comprising:

attaching a power supply to the portable device, the power supply providing a voltage and a current to the device;

changing an electric current demand of the portable device by a preselected amount;

observing the voltage of the power supply;

if the power supply voltage changes to a preselected level upon changing the electric current demand, indicating to a user of the portable device that the power supply is compatible; and if the power supply voltage does not change to a preselected level upon changing the electric current demand, indicating to a user of the portable device that the power supply is incompatible.

2. A method for determining power supply compatibility as defined in claim 1, wherein:

if the power supply voltage increases to a preselected level upon changing the electric current demand, indicating to a user of the portable device that the power supply is compatible; and if the power supply voltage does not increase to a preselected level upon changing the electric current demand, indicating to a user of the portable device that the power supply is incompatible.

3. A method for determining power supply compatibility as defined in claim 1, wherein:

if the power supply voltage decreases to a preselected level upon changing the electric current demand, indicating to a user of the portable device that the power supply is compatible; and if the power supply voltage does not decrease to a preselected level upon changing the electric current demand, indicating to a user of the portable device that the power supply is incompatible.

4. A method for determining power supply compatibility as defined in claim 1, wherein:

if the power supply voltage changes by a preselected level upon changing the electric current demand, indicating to a user of the portable device that the power supply is compatible; and if the power supply voltage does not change by a preselected level upon changing the electric current demand, indicating to a user of the portable device that the power supply is incompatible.

5. A method for determining power supply compatibility as defined in claim 1, wherein if the power supply voltage does not change to a preselected level upon changing the electric current demand, indicating to a user of the portable device that the charger is incompatible, the method further comprising ceasing the charging.

6. A method of charging a battery of a portable device, comprising providing an initial voltage and electric current to the battery by a power supply;

sensing the electric current exceeding a preselected threshold; and changing the initial voltage to a preselected level;

wherein, in response to the changing the initial voltage, the portable device indicates to a user of the portable device that the power supply is compatible.

7. A method of charging a battery of a portable device as defined by claim 6, wherein the changing the initial voltage comprises increasing the initial voltage to a preselected level.

8. A method of charging a battery of a portable device as defined by claim 6, wherein the changing the initial voltage comprises decreasing the initial voltage to a preselected level.

9. A method of charging a battery of a portable device as defined by claim 6, wherein the changing the initial voltage comprises changing the initial voltage by a preselected amount.

* * * * *